United States Patent [19]

Travis

[11] 3,955,810

[45] May 11, 1976

[54] CLAMPING APPARATUS

[76] Inventor: Jimmy K. Travis, 572 Douglas Drive, Circleville, Ohio 43113

[22] Filed: July 12, 1974

[21] Appl. No.: 487,965

[52] U.S. Cl. .............................. 269/238; 24/134 L; 294/104
[51] Int. Cl.² ........................................... B25B 5/04
[58] Field of Search ...... 294/104; 24/134 M, 134 L, 24/134 R; 269/228, 238

[56] References Cited
UNITED STATES PATENTS

| 481,179 | 8/1892 | Klein | 24/134 L |
|---|---|---|---|
| 2,308,485 | 1/1943 | Bass | 294/104 |
| 2,360,601 | 10/1944 | Waldrup | 294/104 |
| 2,607,095 | 8/1952 | Maasdam | 24/134 L |
| 3,150,895 | 9/1964 | Lebre | 269/228 |

Primary Examiner—Roy Lake
Assistant Examiner—Neil Abrams

[57] ABSTRACT

Apparatus for clamping a workpiece, such as the end portion of a conveyor belt, includes a link member having an upper end portion and a lower end portion with a receiving member secured intermediate the end portions for horizontally supporting the workpiece. A bent lever having a first end portion angularly disposed relative to a second end portion is pivotally connected at a fulcrum point to the link member upper end portion. An arcuate blade member having a clamping surface is secured to and projects outwardly from the lever arm first end portion above the receiving member. An actuator is pivotally connected at one end portion to the lever second end portion and at the opposite end to the lower end portion of the link member. The application of a selected force to the actuator in a direction away from the link member pivots the lever about the fulcrum point on the link member downwardly and urges the blade clamping surface into frictional engagement with the workpiece. The actuating force applied to the actuator is multiplied by the lever to exert upon the workpiece a resultant clamping force of substantially greater magnitude to rigidly secure the workpiece between the blade member and receiving member.

8 Claims, 4 Drawing Figures

CLAMPING APPARATUS

BACKGROUND OF THE INVENTION

1. Field of the Invention

This invention relates to a clamping apparatus and more particularly to a clamping apparatus having a force multiplying linkage capable of applying to a workpiece a force which is substantially greater than the actuating force applied to the clamping apparatus.

2. Description of the Prior Art

Conventional clamping devices as illustrated and described in U.S. Pat. Nos. 438,104; 1,947,607; 2,386,567 and 2,835,291 provide a lever or movable power arm for applying and releasing a clamping force through a series of linkages to engage a workpiece between a pair of coacting jaws. Once the actuating force has been applied and the coacting jaws urged into clamping relationship with the workpiece, the actuating force is removed from the lever or power arm. A suitable locking means maintains the jaws in clamping relationship with the workpiece.

In instances where a large force is required to be applied to a workpiece by the coacting jaws, the limited actuating force is insufficient to apply the resultant clamping force without providing additional adjusting apparatus and locking means to the clamping device. Furthermore, in instances of limited work area it is not feasible to utilize a large and cumbersome clamping device to generate a corresponding large clamping force. Problems are also encountered in the application and release of the clamping force to provide for efficient operation of the clamping device. Furthermore, many operations which require the securing of a workpiece do not permit extensive adjustments to be made to the clamping device before the clamping force is generated and subsequently released. However, conventional clamping devices require such adjustments to be made.

There is need to provide apparatus for clamping a workpiece that is capable of generating a clamping force which is substantially greater than the actuating force without requiring extensive adjustments to be made to the clamping device once the actuating force has been applied. The clamping device must be lightweight with as few moving parts as necessary to insure the quick application and release of the clamping force to the workpiece.

SUMMARY OF THE INVENTION

In accordance with the present invention there is provided apparatus for clamping a workpiece which includes a lever having a first end portion and a second end portion A fulcrum point is provided on the lever between the first and second end portions. A blade member is secured to and extends outwardly from said lever first end portion. The blade member includes a lower clamping surface. A link member having upper and lower end portions is pivotally connected at the upper end portion to the fulcrum point. A workpiece receiving member is secured to the link member and horizontally supports the workpiece below the blade member. An actuator is pivotally connected to the lever second end portion and the link member lower end portion. The actuator is operable to move the blade member clamping surface into clamping position with the workpiece receiving member. Thus, the application of a selected force to the actuator urges the clamping surface of the blade member into frictional engagement with the workpiece to rigidly secure the workpiece between the blade member and the receiving member.

The actuator includes a pair of actuating arms which are pivotally connected at their adjacent end portions. The other end portion of the first actuating arm is, in turn, pivotally connected to the lever arm second end portion and the other end portion of the second actuating arm is pivotally connected to the lower end portion of the link member. An actuating force is applied to the joint of the first and second actuating arms in a direction away from the link member and is transmitted to the lever and thereby pivot the lever about the fulcrum point on the link member toward the workpiece. The force transmitted through the first actuating arm to the lever moves the blade member secured thereon into frictional engagement with the workpiece positioned on the workpiece receiving member.

The blade member has a leading edge portion and a trailing edge portion with an arcuate clamping surface therebetween. As the lever moves angularly downward toward the workpiece, the blade leading edge portion passes over the surface of the workpiece before the arcuate clamping surface frictionally engages the workpiece. Thus, the force applied to the lever by the actuator is multiplied by the lever, and a downwardly directed force of substantially greater magnitude is applied by the arcuate clamping surface of the blade member to rigidly secure the workpiece on the receiving member. At the point of maximum force application on the workpiece the blade member is necessarily displaced from vertical alignment with the workpiece.

Accordingly, the principal object of this invention is to provide apparatus for rigidly securing a workpiece by a clamping force which is substantially greater than the actuating force.

Another object of the present invention is to provide a clamping apparatus having a force multiplying linkage to permit the application upon a conveyor belt section a force which is substantially greater than the force required to activate the clamping apparatus.

A further object of this invention is to provide a clamping apparatus light in weight and easily operable to fixedly secure a workpiece, such as a conveyor belt section, by the application of a force directed thereon which is a substantial multiple of the force required to activate the clamping apparatus.

These and other objects and advantages of this invention will be more completely described and disclosed in the following specification, the accompanying drawings and the appended claims.

DESCRIPTION OF THE PREFERRED EMBODIMENT

Figure 1:
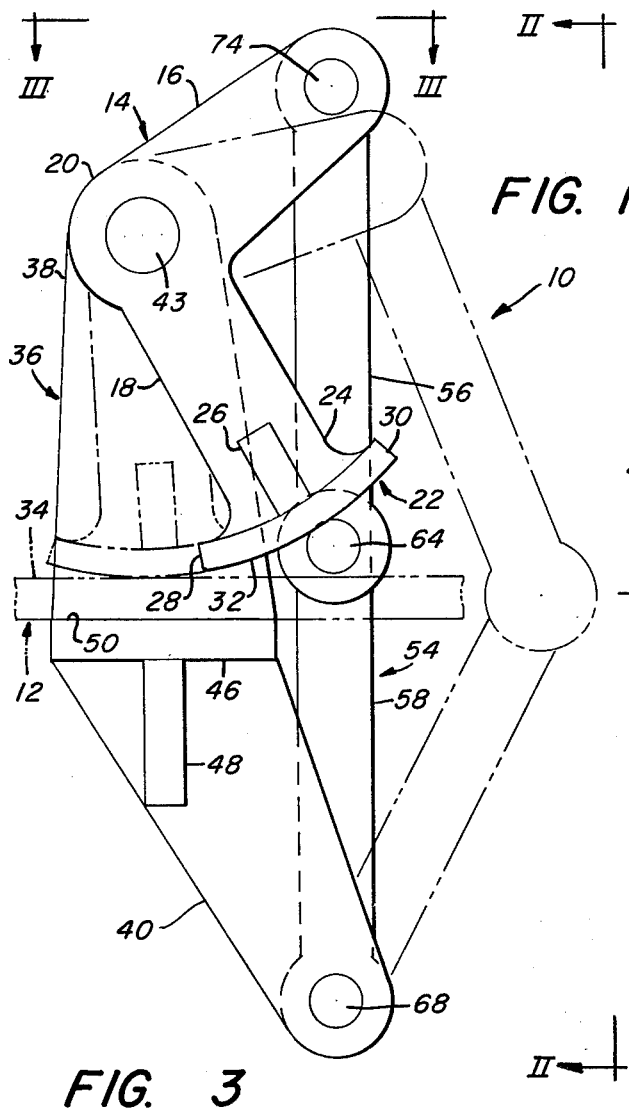
FIG. 1 is a view in side elevation of the clamping apparatus, illustrating movement of the bent lever into and out of frictional engagement with a workpiece shown in dashed lines on the support platform of the apparatus.
Figure 2:
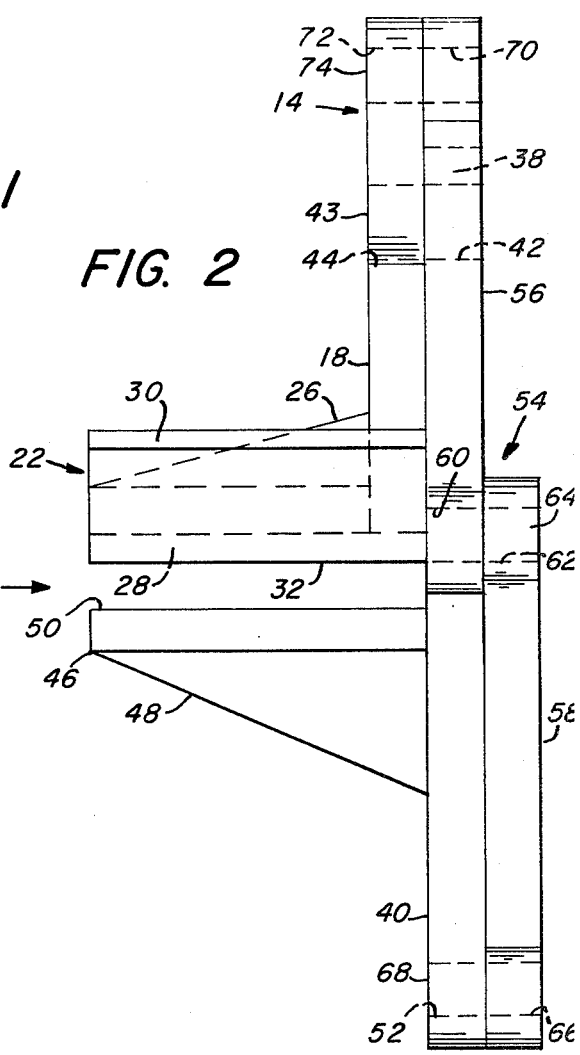
FIG. 2 is a front view of the clamping apparatus taken along the line II—II of FIG. 1.
Figure 3:
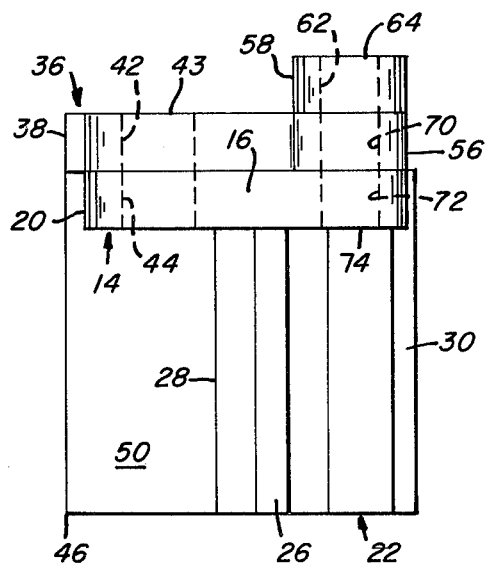
FIG. 3 is a top plan view of the clamping apparatus taken along the line III—III of FIG. 1.

Referring to the drawings, and particularly FIGS. 1–3, there is illustrated a clamping apparatus generally designated by the numeral 10 for frictionally engaging a workpiece, such as the conveyor belt 12 illustrated in FIG. 1. The clamping apparatus 10 includes a bent lever generally designated by the numeral 14 having a first lever arm 16 and a second lever arm 18 angularly positioned relative to the first lever arm 16.

The bent lever 14 is provided with a fulcrum 20 positioned between the lever arm 16 and the lever arm 18. The lever 14 is arranged to pivot about the fulcrum 20 in a manner hereinafter explained. The second lever arm 18 includes an arcuate blade portion 22 that is secured to end portion 24 of the lever arm 18 by a gusset 26. The gusset member 26 is secured to the lever 18 and to the blade 22 so that the blade 22 is positioned perpendicular to the surface of lever 18. As illustrated in FIG. 1, the blade 22 has an arcuate configuration with a leading edge portion 28 and a trailing edge portion 30. The blade 22 has a lower bearing surface 32 that is arranged to frictionally engage the top surface 34 of the belt 12.

A link member generally designated by the numeral 36 includes an upper end portion 38 and a lower end portion 40. As illustrated in FIGS. 2 and 3, the upper end portion 38 is provided with a bore 42 which is aligned with a bore 44 extending through the fulcrum 20 of the lever 14. A pin member 43 extends through the aligned bores 42 and 44 to thereby connect the upper end portion 38 of the link member 36 to the lever 14 at the fulcrum 20 and permit pivotal movement of the lever 14 relative to link member 36.

Intermediate of the link member upper end portion 38 and lower end portion 40 is positioned a workpiece receiving member, such as a support platform 46. The support platform 46 is rigidly secured to the link member 36 by a lower gusset 48 that extends outwardly from the lower end portion 40. With this arrangement, the support platform 46 is positioned perpendicular to the surface of the link member 36 and extends horizontally outwardly therefrom. The platform 46 has an upper surface 50 arranged to horizontally support the belt 12 relative to the link member 36, as illustrated in FIG. 1.

Referring to FIGS. 1 and 2, an actuating mechanism generally designated by the numeral 54 includes a first movable strut or actuating arm 56 and a second movable strut or actuating arm 58. The lower end portion of actuating arm 56 is provided with a bore 60 that is axially aligned with a bore 62 provided in the upper end portion of actuating arm 58. The aligned bores 60 and 62 are arranged to receive a suitable fastening device, such as pin 64 for connecting the lower end portion of actuating arm 56 to the upper end portion of actuating arm 58. The lower end portion of actuating arm 58 has a bore 66 which is aligned with a bore 52 in the link member lower end portion 40. A pin member 68 extends through the aligned bores 52 and 66 to pivotally connect the link member lower end portion 40 to the actuating arm 58. Similarly, the upper end portion of the actuating arm 56 is provided with a bore 70 that is aligned with a bore 72 in the first lever arm 16. A pivot pin 74 passes through the aligned bores 70 and 72 to provide pivotal movement of the actuating arm 56 relative to the lever arm 16 of the bent lever 14.

As illustrated in FIG. 1, the actuating arms 56 and 58 are initially positioned in vertical alignment and the bent lever 14 angularly disposed relative to the link member 36 and the belt 12. The application of an actuating force to the joint 64 of the actuating arms 56 and 58 in a horizontal plane away from the link member 36, as indicated by the arrow, displaces the joint 64 from the position shown by the solid lines to the position shown by the dashed lines. The pivot connection 68 of the actuating arm 58 to the link member lower end portion 40 remains fixed as the arm 58 pivots about the connection 68. The bent lever 14 pivots about pin member 43 at the fulcrum point 20, and the blade leading edge portion 28 passes over the surface 34 of the belt 12. The pivot connection 74 of the actuating arm 56 and lever arm 16 moves downwardly as the arm 56 pivots relative to the arm 16 about the connection 74.

As the actuating arms 56 and 58 move from a vertical relationship to an angular relationship, the bent lever 14 pivots about the fulcrum 20 in a clockwise direction on the link member upper end portion 38. The lever 14 continues to pivot about the fulcrum 20 until the bearing surface 32 of the arcuate blade 22 frictionally engages the surface 34 of the belt 12 as indicated by the dashed lines in FIG. 1. With this arrangement, the leading edge portion 28 of the blade 22 first moves into abutting relation with the belt surface 34 and then moves out of abutting relation therewith. As the lowermost portion of the blade 22 moves into abutting relation with the surface 34, the belt 12 is compressed. The blade 22 will continue to compress the belt 12 until it frictionally engages the surface 34, and the bent lever 14 is in static equilibrium with the belt 12. Thus, the belt 12 is securely clamped between the blade 22 and the support platform 46. With this arrangement, the lever 14 exerts a downward force upon the belt 12 which is substantially greater than the horizontal actuating force applied to the actuator 54. Thus, the force applied by the bent lever 14 upon the belt 12 is a substantial multiplication of the actuating force to the actuator 54. In addition, only a small angular displacement of the bent lever 14 is required to achieve the force multiplication after the blade 22 initially contacts the belt 12.

As illustrated in FIG. 1, the second lever arm 18 is displaced from vertical alignment with the belt surface 34 when the blade 22 is in static equilibrium with the belt 12. Theoretically, the actuating force applied to the actuating mechanism 54 is multiplied by the lever 14 to exert upon the belt 12 by the blade 22 a maximum resultant force when the bearing surface 34 is positioned perpendicular to the belt surface 32. However, at this point of maximum force multiplication, the blade 22 is unstable with respect to the belt 12, such that a incremental increase in the magnitude of the actuating force will displace the blade 22 from frictional engagement with the belt 12. The belt is then released from clamping engagement between the blade 22 and the support platform 46. Accordingly, to maintain a stable relationship between the blade 22 and the belt 12 with the largest permissible force acting upon the belt 22, the blade bearing surface 32 is positioned at an angle with respect to the belt surface 34. Preferably, the angular relationship between the bearing surface 32 and the belt surface 34 for a maximum force application under stable condition should not be less than 5°.

To accommodate workpieces of varied thickness, the length of the lever arms 16 and 18 may be altered to insure that the blade 22 securely engages the workpiece on the support platform 46. In a specific embodiment, for example, a force of 2,000 pounds applied to the actuating mechanism 54 moves the blade 22 on the lever arm 18 into frictional engagement with the belt 12 to apply a downward force of 13,340 pounds on the belt 12. This represents a force multiplication of approximately 6.7 times the actuating force.

Figure 4:
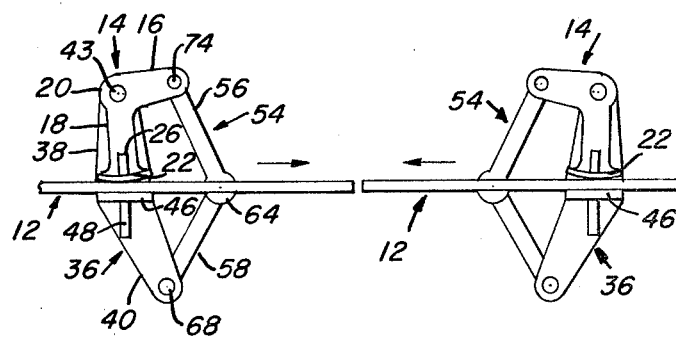
FIG. 4 is a schematic illustration of the manner in which the clamping apparatus may be used to engage the end portions of adjacently positioned conveyor belts for splicing together.

Referring to FIG. 4, there is illustrated an application of the present invention in which two belt clamping devices are employed to tension the end portions of opposed sections of conveyor belt so that they may be adjacently positioned for splicing in a conventional manner, such as by stitching, cementing, riveting and the like. The application of actuating forces to the actuating mechanisms 54 of each clamping tool in the direction indicated by the arrows pivots the bent lever 14 on the link member 36 so that the blade 22 frictionally engages the belt 12 on the support platform 46. In this manner, the free ends of the belt are securely positioned for splicing. However, it will be apparent that the present invention is not limited to the application of splicing conveyor belt sections but has additional applications, such as installing a new belt in place of a worn belt. Generally, the practice of this invention is applicable to any situation where it is desirable to multiply a given actuating force to ultimately exert upon a workpiece a resultant clamping force of substantially greater magnitude.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:
1. Apparatus for clamping a workpiece comprising,
   a lever having a first end portion and a second end portion,
   a fulcrum point provided on said lever between said first and second end portion,
   means rigidly secured to said lever first end portion for engaging the workpiece, said engaging means having a lower clamping surface,
   a link member having an upper end portion and a lower end portion,
   said link member upper end portion pivotally connected to said lever at said fulcrum point,
   means secured to said link member and positioned below said engaging means for horizontally supporting the workpiece,
   said lever arranged to pivot relative to said link member about said fulcrum point and move said engaging means into and out of clamping position with said workpiece supporting means, and
   actuating means pivotally connected to said lever second end portion and said link member lower end portion for moving said engaging means clamping surface into and out of clamping position with said workpiece supporting means to thereby exert upon the workpiece of clamping force of a magnitude substantially greater than the force applied to said actuating means,
   said actuating means including,
   a first arm member having an upper end portion pivotally connected to said lever second end portion and a lower end portion,
   a second arm member having an upper end portion pivotally connected to said first arm member lower end portion, and
   said second arm member having a lower end portion pivotally connected to said link member lower end portion
   said first arm member arranged to assume a first position in vertical alignment with said second arm member with three pivotal connections associated with said arm members located in the same plane and a second position angularly disposed with respect to said second arm member when said engaging means is in said clamping position.

2. Apparatus for clamping a workpiece as set forth in claim 1 which includes,
   said lever first end portion angularly disposed relative to said lever second end portion at said fulcrum point so that said lever applies to the workpiece a clamping force substantially greater than the force applied to said actuating means.

3. Apparatus for clamping a workpiece as set forth in claim 1 in which said engaging means includes,
   a blade member rigidly secured to and extending outwardly from said lever first end portion,
   said lever operable to apply upon said workpiece through said blade member a clamping force having a magnitude substantially greater than the actuating force applied to said lever second end portion,
   said blade member having a leading edge portion and a trailing edge portion with said clamping surface formed therebetween.

4. Apparatus for clamping a workpiece as set forth in claim 3 which includes,
   said blade member clamping surface having an arcuate configuration for frictionally engaging the workpiece on said supporting means and applying clamping force to the workpiece which exceeds the force applied to said actuating means.

5. Apparatus for clamping a workpiece as set forth in claim 4 wherein,
   said blade member leading edge portion arranged to pass over the surface of the workpiece before said clamping surface frictionally engages the workpiece.

6. Apparatus for clamping a workpiece as set forth in claim 1 in which said workpiece supporting means includes,
   a workpiece receiving member positioned on said link member intermediate said upper and lower end portion thereof,
   said workpiece receiving member extending perpendicularly outwardly from said link member.

7. Apparatus for clamping a workpiece as set forth in claim 1 which includes,
   said lever first end portion being angularly positioned with respect to said supporting means in said clamping position to exert a maximum clamping force upon the workpiece positioned on said supporting means.

8. Apparatus for clamping a workpiece as set forth in claim 7 wherein,
   said engaging means clamping surface being positioned relative to said supporting means in said clamping position such that said clamping surface forms an angle between a line through the center of the fulcrum point extending perpendicularly to the upper clamping surface of the workpiece supporting means and a line through the center of the fulcrum point extending to the contact of the workpiece with a lower clamping surface of the first end portion of the lever of not less than 5°.

* * * * *